US012643405B2

(12) United States Patent
Yamamoto

(10) Patent No.: US 12,643,405 B2
(45) Date of Patent: Jun. 2, 2026

(54) VEHICLE DISPLAY DEVICE

(71) Applicant: Yazaki Corporation, Tokyo (JP)

(72) Inventor: Sosuke Yamamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 959 days.

(21) Appl. No.: 17/391,197

(22) Filed: Aug. 2, 2021

(65) Prior Publication Data

US 2022/0048389 A1 Feb. 17, 2022

(30) Foreign Application Priority Data

Aug. 13, 2020 (JP) ................................. 2020-136580

(51) Int. Cl.
| | |
|---|---|
| *B60K 35/00* | (2024.01) |
| *B60K 35/10* | (2024.01) |
| *B60K 35/21* | (2024.01) |
| *B60K 35/22* | (2024.01) |
| *B60K 35/28* | (2024.01) |
| *B60K 35/29* | (2024.01) |
| *B60K 35/60* | (2024.01) |

(52) U.S. Cl.
CPC .............. *B60K 35/00* (2013.01); *B60K 35/10* (2024.01); *B60K 35/22* (2024.01); *B60K 35/211* (2024.01); *B60K 35/28* (2024.01); *B60K 35/60* (2024.01); *B60K 2360/167* (2024.01); *B60K 2360/23* (2024.01); *B60K 2360/334* (2024.01); *B60K 2360/691* (2024.01); *B60K 2360/785* (2024.01)

(58) Field of Classification Search
CPC ...................................................... B60K 35/00
See application file for complete search history.

(56) References Cited

U.S. PATENT DOCUMENTS

| | | | |
|---|---|---|---|
| 8,606,430 B2 * | 12/2013 | Seder ....................... | B60Q 1/50 |
| | | | 701/2 |
| 11,586,040 B2 * | 2/2023 | Hirata .................... | B60K 35/10 |

(Continued)

FOREIGN PATENT DOCUMENTS

| | | |
|---|---|---|
| CN | 109073892 A | 12/2018 |
| DE | 10 2011 075 205 A1 | 11/2012 |

(Continued)

OTHER PUBLICATIONS

Google machine translation of Japanese Patent Pub. No. JP4459194B2 filed in 2005 (U.S. Pat. No. 7,408,624 B2) to Evert (Year: 2005).*

*Primary Examiner* — Jean Paul Cass
(74) *Attorney, Agent, or Firm* — Sughrue Mion, PLLC

(57) ABSTRACT

A vehicle display device includes a housing mounted in a vehicle and having a light-shielding outer wall that forms an accommodation space, a slit being formed in the outer wall, a three-dimensional display surface disposed in the accommodation space and on which a real image is formed by display light, a projector disposed in the housing and configured to project the display light onto the display surface, and a reflector disposed outside the housing and having a reflection surface configured to reflect the real image toward an eyepoint in the vehicle. The shape of the reflection surface is a recessed shape such that light rays of the real image intersect in an optical path extending from the display surface to the reflection surface through the slit.

12 Claims, 10 Drawing Sheets

(56)     References Cited

U.S. PATENT DOCUMENTS

| | | | | |
|---|---|---|---|---|
| 11,702,000 | B2 * | 7/2023 | Nakajima | B32B 17/10018 |
| | | | | 428/411.1 |
| 11,772,550 | B2 * | 10/2023 | Oya | B60Q 1/525 |
| | | | | 340/463 |
| 11,776,015 | B2 * | 10/2023 | Manicka | H04W 4/40 |
| | | | | 455/418 |
| 2012/0229882 | A1 * | 9/2012 | Fish, Jr. | G02F 1/157 |
| | | | | 359/267 |
| 2013/0021224 | A1 * | 1/2013 | Fujikawa | G02B 27/0101 |
| | | | | 345/7 |
| 2018/0084245 | A1 * | 3/2018 | Lapstun | G02B 6/105 |
| 2019/0137767 | A1 | 5/2019 | Nambara | |
| 2021/0083152 | A1 * | 3/2021 | Biebersdorf | H10H 20/8514 |

FOREIGN PATENT DOCUMENTS

| | | | | | |
|---|---|---|---|---|---|
| DE | 10 2012 106 638 | A1 | | 1/2013 | |
| JP | 62-157630 | U | | 10/1987 | |
| JP | 2002104017 | A | * | 4/2002 | |
| JP | 4459194 | B2 | * | 4/2010 | G03F 7/70691 |
| JP | 2015069111 | A | * | 4/2015 | |
| JP | 2016-57589 | A | | 4/2016 | |
| JP | 2018-140693 | A | | 9/2018 | |

* cited by examiner

REAR ←— L —→ FRONT

REAR ←——L——→ FRONT

VEHICLE DISPLAY DEVICE

CROSS-REFERENCE TO RELATED APPLICATION(S)

The present application claims priority to and incorporates by reference the entire contents of Japanese Patent Application No. 2020-136580 filed in Japan on Aug. 13, 2020.

BACKGROUND OF THE INVENTION

1. Field of the Invention

The present invention relates to a vehicle display device.

2. Description of the Related Art

Display devices for vehicles have conventionally been used. Japanese Patent Application Laid-open No. 2002-104017 discloses a head-up display and a light control mechanism capable of improving visibility of a display image.

For the vehicle display devices, a need exists to achieve three-dimensional expression. For example, expressiveness can be improved if a virtual image to be visually recognized by an occupant can be provided with a three-dimensional effect based on a three-dimensional real image.

SUMMARY OF THE INVENTION

An object of the present invention is to provide a vehicle display device capable of achieving three-dimensional expression.

In order to achieve the above mentioned object, a vehicle display device according to one aspect of the present invention includes a housing mounted in a vehicle and having a light-shielding outer wall that forms an accommodation space, a slit being formed in the outer wall; a three-dimensional display surface disposed in the accommodation space and on which a real image is formed by display light; a projector disposed in the housing and configured to project the display light onto the display surface; and a reflector disposed outside the housing and having a reflection surface configured to reflect the real image toward an eyepoint in the vehicle, wherein a shape of the reflection surface is a recessed shape such that light rays of the real image intersect in an optical path extending from the display surface to the reflection surface through the slit.

According to another aspect of the present invention, in the vehicle display device, it is preferable that the reflection surface is shaped such that the light rays of the real image intersect in the slit.

According to still another aspect of the present invention, in the vehicle display device, it is preferable that the slit extends along a vehicle width direction, and the reflection surface is shaped such that the light rays of the real image intersect in a vehicle height direction and do not intersect in the vehicle width direction.

According to still another aspect of the present invention, in the vehicle display device, it is preferable that the reflector has a light shielding property, and is located between a windshield of the vehicle and the slit to shield the slit from external light transmitted through the windshield.

According to still another aspect of the present invention, in the vehicle display device, it is preferable that a surface of the outer wall where the slit is formed constitutes an upper surface of an instrument panel of the vehicle, and the reflector is disposed above the upper surface.

According to still another aspect of the present invention, in the vehicle display device, it is preferable that the projector generates an image representing a traveling speed of the vehicle, and the reflector reflects the image representing the traveling speed toward the eyepoint.

According to still another aspect of the present invention, in the vehicle display device, it is preferable that the display surface is a screen.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to embodiments of the present invention will be described in detail with reference to the drawings. It should be noted that these embodiments are not intended to limit the present invention. Additionally, constituent elements in the following embodiments include those easily arrived at by a person skilled in the art or those substantially the same as the constituent elements.

Embodiment

Figure 1:
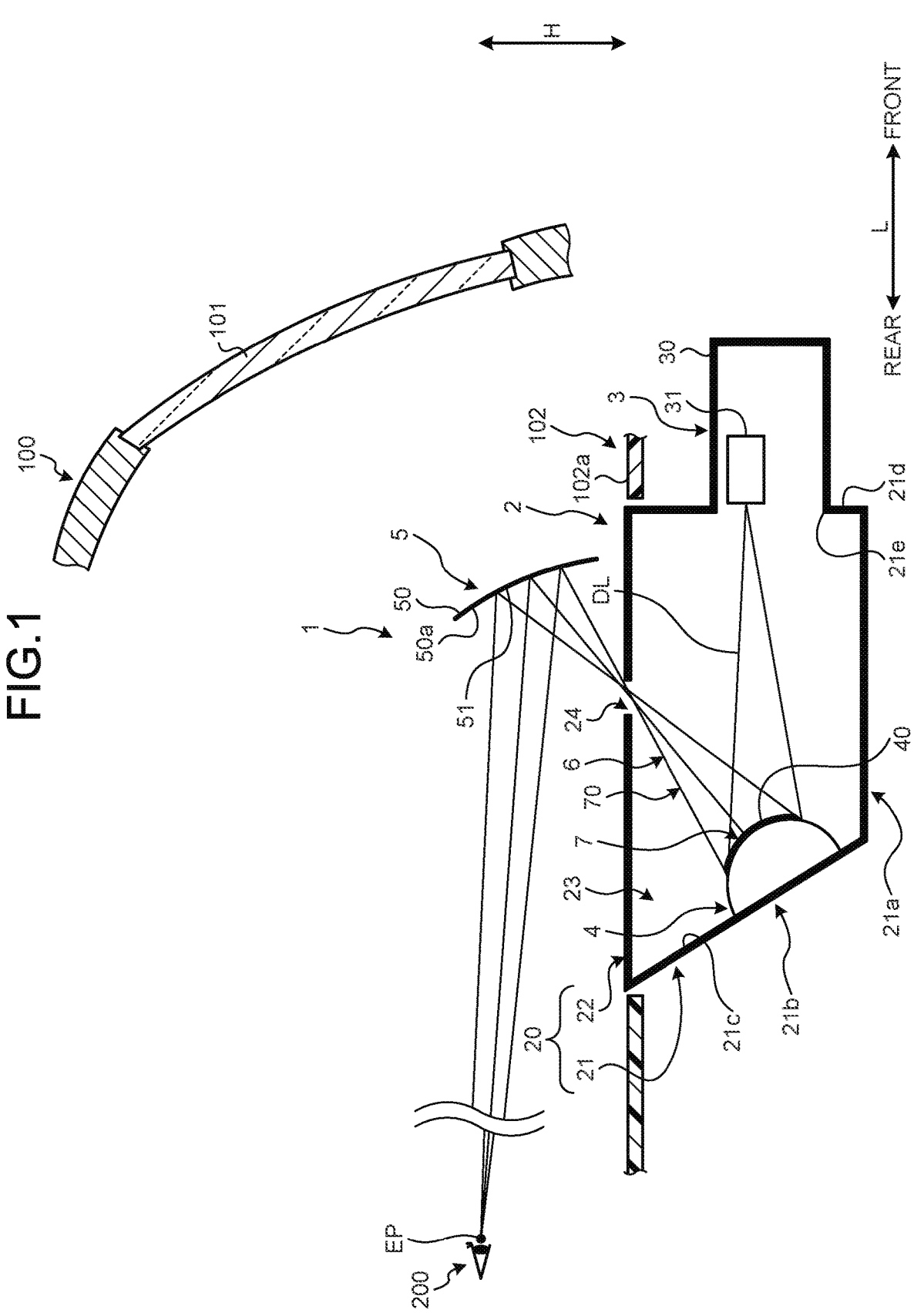
FIG. 1 is a view illustrating arrangement of a vehicle display device according to an embodiment.
Figure 2:
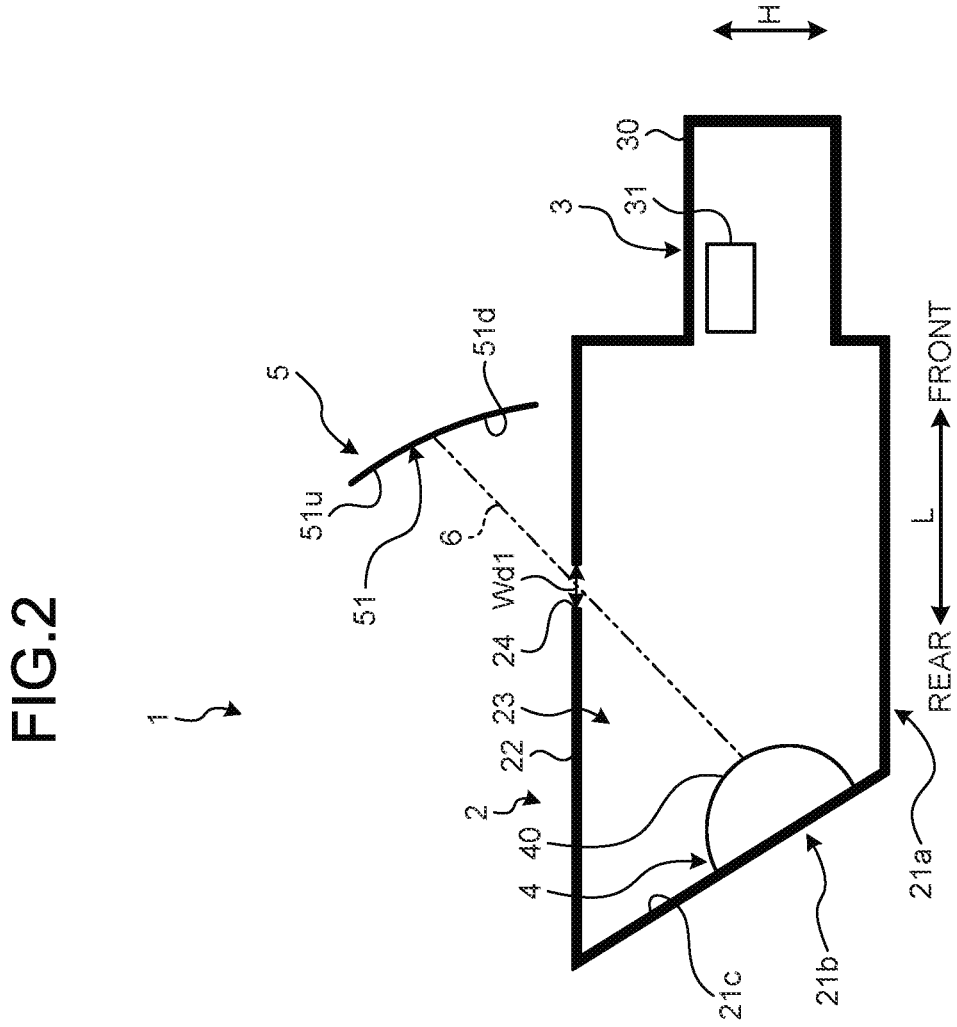
FIG. 2 is a view illustrating a configuration of the vehicle display device according to the embodiment.
Figure 2:
Figure 3:
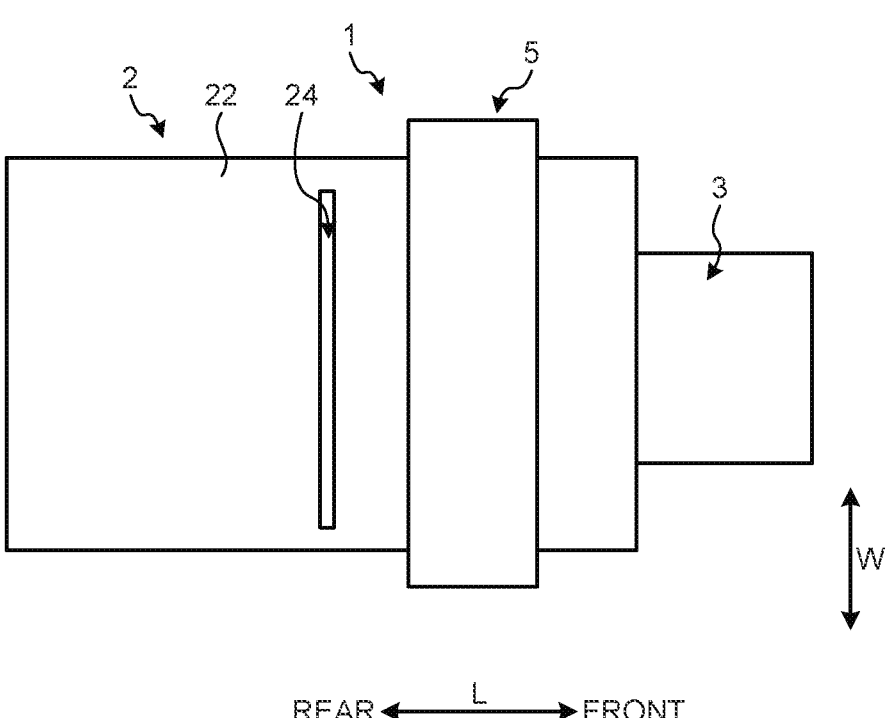
FIG. 3 is a plan view of the vehicle display device according to the embodiment.
Figure 4:
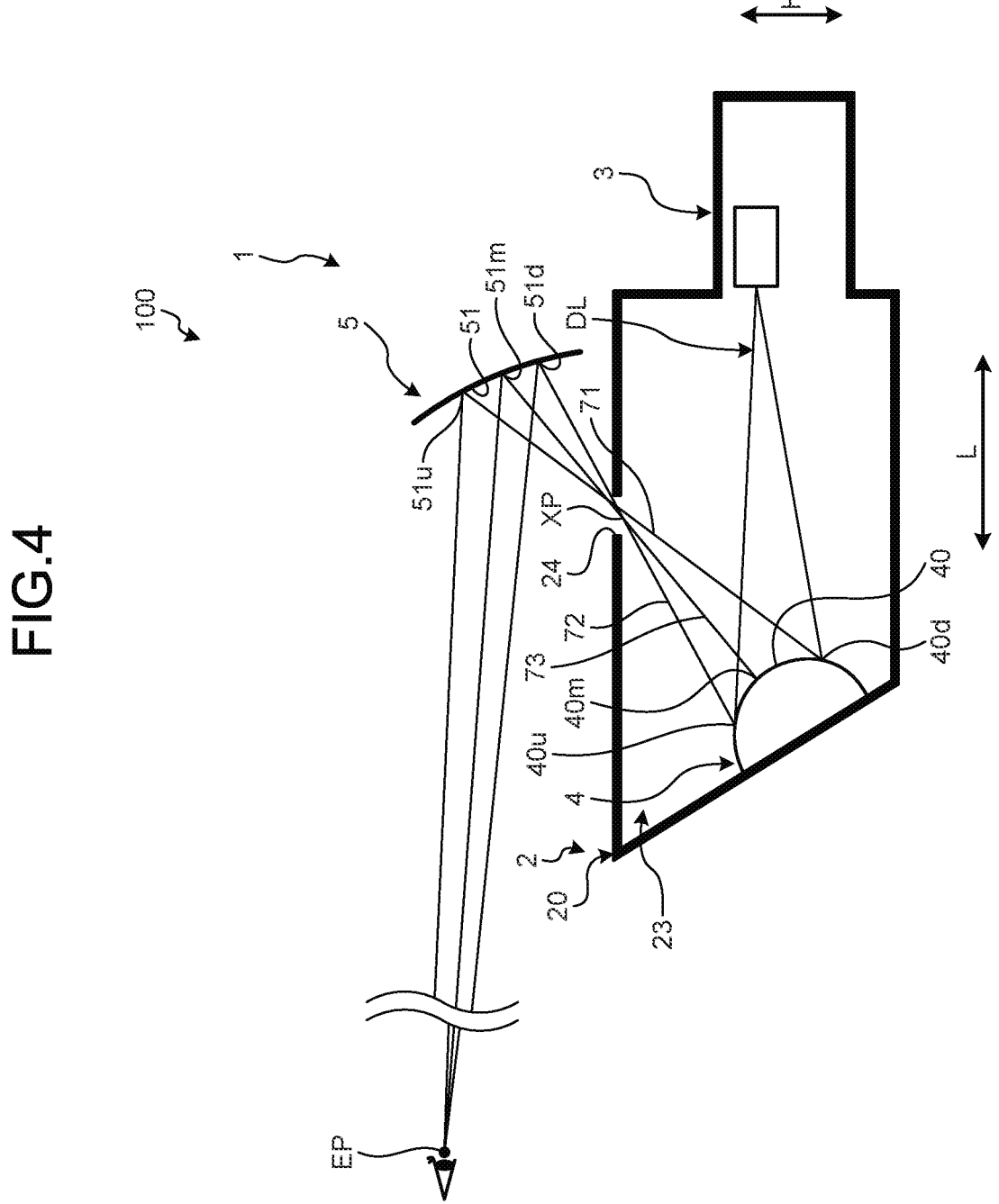
FIG. 4 is a view for explaining an optical path of the vehicle display device according to the embodiment.
Figure 5:
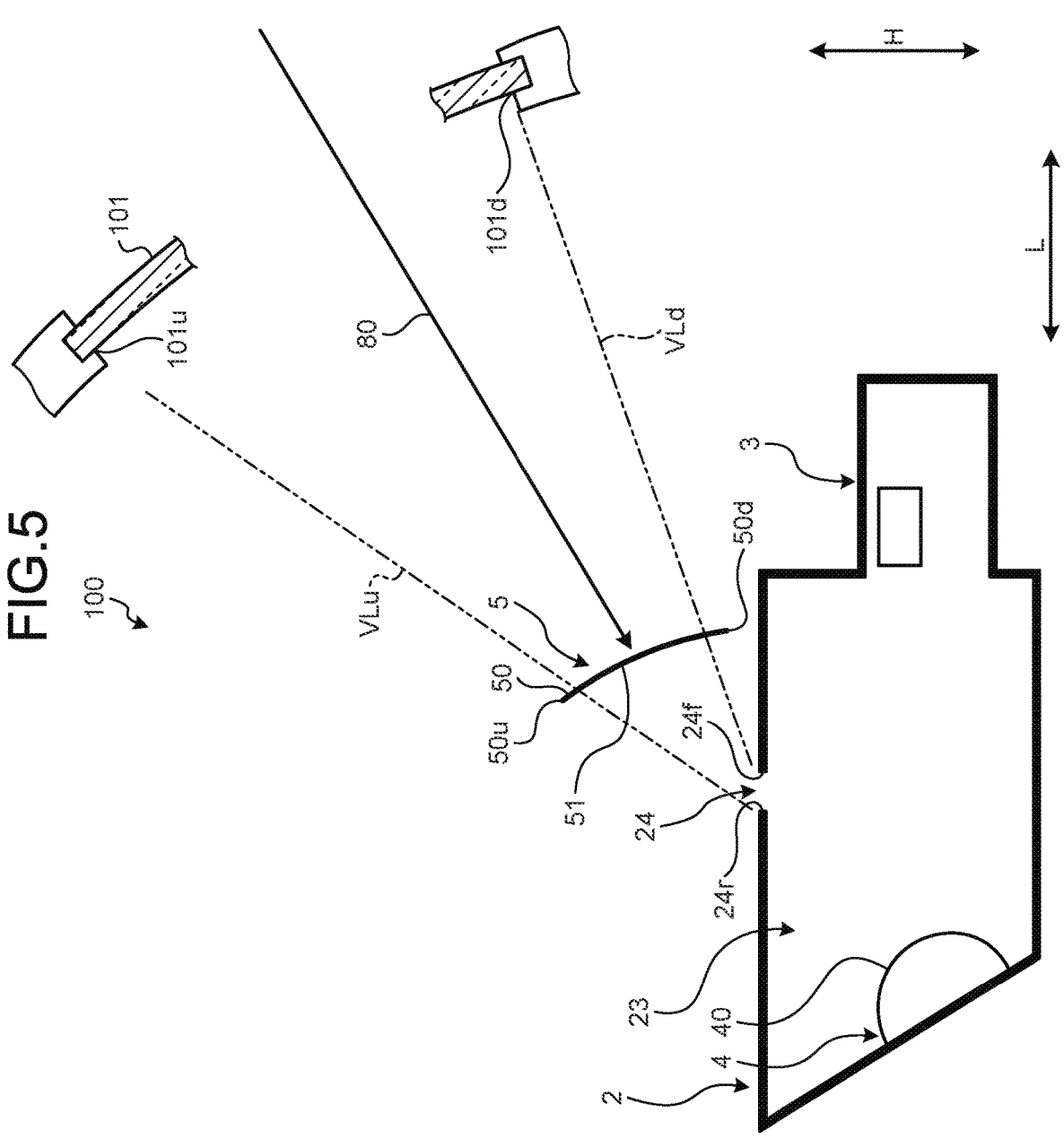
FIG. 5 is a view for explaining a light shielding function of a reflector according to the embodiment.
Figure 6:
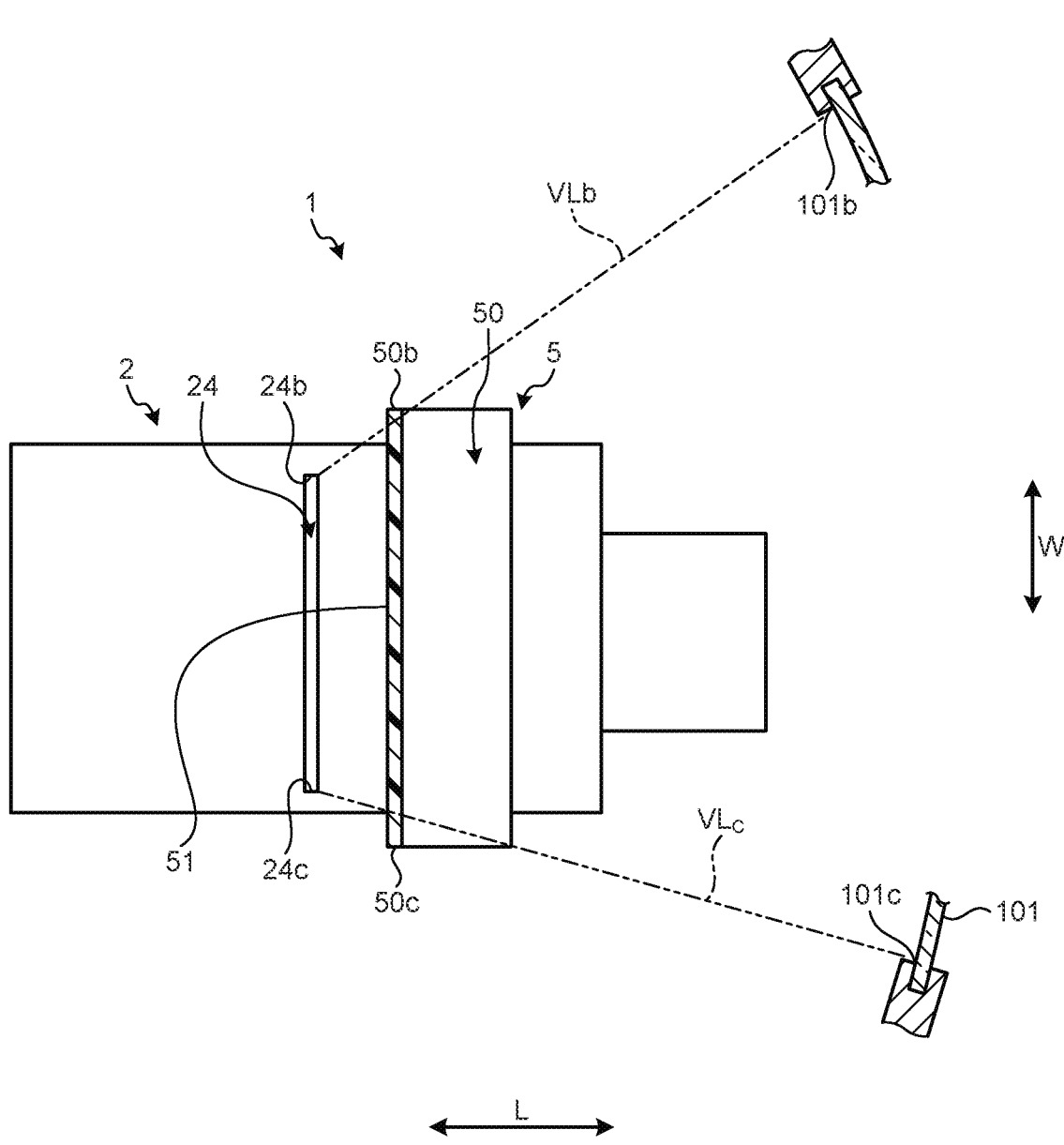
FIG. 6 is a view for explaining the light shielding function of the reflector according to the embodiment.

An embodiment will be described with reference to FIGS. 1 to 6. The present embodiment relates to a vehicle display device. FIG. 1 is a view illustrating arrangement of a vehicle display device according to an embodiment. FIG. 2 is a view illustrating a configuration of the vehicle display device according to the embodiment. FIG. 3 is a plan view of the vehicle display device according to the embodiment. FIG. 4 is a view for explaining an optical path of the vehicle display device according to the embodiment. FIGS. 5 and 6 are views for explaining a light shielding function of a reflector according to the embodiment.

As illustrated in FIGS. 1 and 2, a vehicle display device 1 according to the present embodiment is mounted in a vehicle 100 such as an automobile. The vehicle 100 may be an electric vehicle (EV), a hybrid electric vehicle (HEV), or a plug-in hybrid electric vehicle (PHEV). The vehicle display device 1 displays a traveling speed or the like of the vehicle 100 as, for example, a meter device of the vehicle 100. The vehicle display device 1 may be used as a part of the meter device.

The vehicle display device 1 includes a housing 2, a projector 3, a screen 4, and a reflector 5. The housing 2 has a light-shielding outer wall 20. The illustrated outer wall 20 has a body 21 and a lid 22. The body 21 has a bottom wall 21$a$ and a side wall 21$b$. The bottom wall 21$a$ has, for example, a flat plate shape. The side wall 21$b$ is erected upward in a vehicle height direction H from an edge of the bottom wall 21$a$. The side wall 21$b$ has a tubular shape, e.g., a rectangular tube shape. The side wall 21$b$ is a peripheral wall entirely surrounding the bottom wall 21$a$. A lower end of the side wall 21$b$ is closed by the bottom wall 21$a$, and an upper end of the side wall 21$b$ is opened.

The lid 22 is a member closing the upper end of the side wall 21$b$. The lid 22 is attached to the body 21 to form an accommodation space 23. The accommodation space 23 is a closed space, and is a dark room surrounded by the light-shielding outer wall 20. The lid 22 has, for example, a flat plate shape. A slit 24 is formed in the lid 22. The slit 24 penetrates the lid 22 along a plate thickness direction of the lid 22. The slit 24 is an elongated through hole and makes a space above the housing 2 and the accommodation space 23 communicate with each other. The slit 24 of the present embodiment extends along a vehicle width direction W as illustrated in FIG. 3. An opening width Wd1 of the slit 24 is a width in a vehicle longitudinal direction L of the slit 24 as illustrated in FIG. 2.

As illustrated in FIG. 1, the lid 22 constitutes an upper surface 102$a$ of an instrument panel 102. In other words, an upper surface of the lid 22 is located on a plane flush with the upper surface 102$a$ of the instrument panel 102. For example, the lid 22 is arranged so as to close an opening formed in the instrument panel 102. The body 21 of the housing 2 is accommodated in a space formed by the instrument panel 102.

The screen 4 is disposed in the accommodation space 23. The illustrated screen 4 is fixed to an inner surface of the side wall 21$b$. More specifically, the screen 4 is disposed on a wall surface 21$c$ of the side wall 21$b$ on the rear end side in the vehicle longitudinal direction L. The wall surface 21$c$ is a surface inclined so as to be directed obliquely upward. The screen 4 has a three-dimensional display surface 40. The screen 4 is a reflective screen that diffuses light at the display surface 40. The illustrated display surface 40 has a hemispherical shape. The display surface 40 is directed frontward in the vehicle longitudinal direction L. The illustrated display surface 40 faces toward the slit 24.

The projector 3 is disposed in the housing 2. The illustrated projector 3 is fixed to the side wall 21$b$. More specifically, the projector 3 is disposed on a wall 21$d$ on the front end side in the vehicle longitudinal direction L within the side wall 21$b$. The projector 3 has a housing 30 and an output unit 31. The housing 30 is fixed to the outside of the front-end wall 21$d$. An opening 21$e$ is formed in the front-end wall 21$d$. For example, the housing 30 is fitted to the side wall 21$b$ so as to close the opening 21$e$. The housing 30 has a light-shielding property and closes the opening 21$e$ so as to prevent external light from entering the accommodation space 23. The housing 30 of the projector 3 may be formed integrally with the body 21.

The output unit 31 is a device outputting display light DL. The output unit 31 is, for example, a laser projector that scans the display surface 40 with laser light. The output unit 31 may be a liquid crystal display that projects on the display surface 40 an image displayed on a liquid crystal panel. A method of outputting the display light DL from the output unit 31 is not limited to the laser and the liquid crystal panel.

The output unit 31 projects the display light DL onto the display surface 40. The display light DL forms a real image 7 on the display surface 40. The formed real image 7 may be any image. For example, the real image 7 is an image representing information regarding the vehicle 100. The information regarding the vehicle 100 includes, for example, a traveling speed, a traveling mode, and a traveling distance of the vehicle 100. The real image 7 formed on the display surface 40 may be also an image for information presentation, attention calling, warning, and the like to an occupant from the vehicle 100. The real image 7 may include a route guidance image of a car navigation system.

The reflector 5 is disposed outside the housing 2. The reflector 5 has a reflection surface 51 that reflects the real image 7 formed on the display surface 40 toward an eyepoint EP of the vehicle 100. The eyepoint EP is a position assumed as an eye position of an occupant 200, or an actual eye position of the occupant 200. The actual eye position is detected by, for example, a detecting unit such as a camera mounted in the vehicle 100.

The reflector 5 has a light-shielding body 50. The body 50 is a plate-like member formed of, for example, black or dark-colored resin. The body 50 is supported by, for example, the housing 2. The vehicle display device 1 may have a mechanism for adjusting an inclination angle or the like of the body 50 according to the position of the eyepoint EP. The body 50 has a recessed surface 50$a$ facing the eyepoint EP. The recessed surface 50$a$ is directed to the rear side of the vehicle and is also directed to the lower side in the vehicle height direction H. A sectional shape of the illustrated body 50 is a curved shape that is recessed on the side facing the eyepoint EP. For example, the section illustrated in FIG. 1 is perpendicular to the vehicle width direction W.

The reflection surface 51 is disposed on the recessed surface 50$a$ of the body 50. The reflection surface 51 is formed by, for example, coating or deposition on the recessed surface 50$a$. The reflection surface 51 may be a surface of a member different from the body 50. In other words, a mirror having the reflection surface 51 may be attached to the body 50. The reflection surface 51 is configured to have high reflectance.

As illustrated in FIG. 2, the reflection surface 51 of the reflector 5 is disposed on an optical path 6 connecting the display surface 40 and the slit 24. The reflection surface 51 is also arranged so as to reflect the real image 7 on the display surface 40 toward the eyepoint EP. The illustrated reflection surface 51 is inclined such that an upper portion 51$u$ of the reflection surface 51 is located more to the rear side in the vehicle longitudinal direction L than a lower portion 51$d$ of the reflection surface 51 is. The inclination angle of the reflection surface 51 is set according to the position of the display surface 40, the position of the slit 24, the position of the eyepoint EP, and the like.

As illustrated in FIG. 1, the shape of the reflection surface 51 is a recessed shape that is curved such that light rays 70 of the real image 7 intersect in the optical path 6. The optical path 6 is an optical path from the display surface 40 toward the reflection surface 51 through the slit 24. The display light DL projected on the display surface 40 is diffused at the display surface 40 to form the real image 7. The diffused light partially passes through the slit 24 and is reflected toward the eyepoint EP by the reflection surface 51. The reflected light reflected by the reflection surface 51 allows a user to visually recognize a virtual image based on the three-dimensional real image 7. The virtual image is formed at a position ahead of the reflection surface 51.

As illustrated in FIG. 4, a light ray 71 diffused at a lower portion 40d of the display surface 40 and passing through the slit 24 is reflected toward the eyepoint EP by the upper portion 51u of the reflection surface 51. Meanwhile, a light ray 72 diffused at an upper portion 40u of the display surface 40 and passing through the slit 24 is reflected toward the eyepoint EP by the lower portion 51d of the reflection surface 51. Additionally, a light ray 73 diffused at a middle portion 40m of the display surface 40 and passing through the slit 24 is reflected toward the eyepoint EP by a middle portion 51m of the reflection surface 51.

The reflection surface 51 is designed such that the light rays 71, 72, and 73 intersect at a position XP. For example, the inclination angle of the upper portion 51u of the reflection surface 51 is an inclination angle to reflect the light ray 71, which passes through the slit 24 out of the light rays diffused at the lower portion 40d of the display surface 40, toward the eyepoint EP. The inclination angle of the lower portion 51d of the reflection surface 51 is an inclination angle to reflect the light ray 72, which passes through the slit 24 out of the light rays diffused at the upper portion 40u of the display surface 40, toward the eyepoint EP. Similarly, the inclination angle of the middle portion 51m of the reflection surface 51 is an inclination angle to reflect the light ray 73, which passes through the slit 24 out of the light rays diffused at the middle portion 40m of the display surface 40, toward the eyepoint EP. The position XP where the light rays 71, 72, and 73 intersect is determined by the shape or the like of the reflection surface 51. In other words, the intersecting position XP can be adjusted by the position and shape of the reflection surface 51.

As described above, the reflection surface 51 is shaped such that the light rays 70 of the real image 7 intersect in the optical path 6 extending from the display surface 40 to the reflection surface 51 through the slit 24. In the illustrated vehicle display device 1, the light rays 70 intersect in the vehicle height direction H. In other words, the light rays 70 of the real image 7 intersect when viewed from the vehicle width direction W. Since the light rays 70 intersect, the opening width Wd1 of the slit 24 can be reduced. The vehicle display device 1 of the present embodiment is configured such that the light rays 70 of the real image 7 do not intersect in the vehicle width direction W. In other words, the light rays 70 travel in parallel without intersecting in the optical path 6 from the display surface 40 to the reflection surface 51.

When the opening width Wd1 of the slit 24 is small, external light such as sunlight hardly enters the accommodation space 23. That is, the accommodation space 23 is maintained in a dark state. Thus, the occupant can visually recognize a clear virtual image based on the real image 7 with high contrast. The real image 7 is a three-dimensional image displayed on the display surface 40 having a three-dimensional shape. Consequently, the vehicle display device 1 of the present embodiment achieves three-dimensional and novel image expression.

As illustrated in FIG. 4, the position XP where the light rays 70 intersect is located in the slit 24. That is, the light rays 70 of the real image 7 intersect within the space of the slit 24. By designing the reflection surface 51 such that the light rays 70 intersect in the slit 24 as described above, the opening width Wd1 of the slit 24 can be minimized.

Additionally, the reflector 5 of the present embodiment shields the slit 24 from external light 80 passing through a windshield 101 as described below. As illustrated in FIG. 5, the light-shielding body 50 is located between the windshield 101 and the slit 24 to shield the slit 24 from the windshield 101. More specifically, an upper end 50u of the body 50 is located above an upper virtual line VLu. The upper virtual line VLu is a straight line connecting a rear end 24r of the slit 24 and an upper end 101u of the windshield 101. A lower end 50d of the body 50 is located below a lower virtual line VLd. The lower virtual line VLd is a straight line connecting a front end 24f of the slit 24 and a lower end 101d of the windshield 101.

Thus, the external light 80 transmitted through the windshield 101 into a vehicle interior is blocked by the body 50 of the reflector 5 and does not reach the slit 24. The reflector 5 of the present embodiment can thereby prevent the external light 80 such as sunlight from entering the accommodation space 23.

The reflector 5 may also shield the slit 24 in the vehicle width direction W as illustrated in FIG. 6. A left end 50b of the reflector 5 illustrated in FIG. 5 is located more to the left side than a left virtual line VLb is. The left virtual line VLb is a straight line connecting a left end 101b of the windshield 101 and a left end 24b of the slit 24. A right end 50c of the reflector 5 is located more to the right side than a right virtual line VLc is. The right virtual line VLc is a straight line connecting a right end 101c of the windshield 101 and a right end 24c of the slit 24.

As described above, the vehicle display device 1 according to the present embodiment includes the housing 2 mounted in the vehicle 100, the display surface 40, the projector 3, and the reflector 5. The housing 2 has the light-shielding outer wall 20 that forms the accommodation space 23. The slit 24 is formed in the outer wall 20. The display surface 40 is disposed in the accommodation space 23. The display surface 40 is a three-dimensional surface where the real image 7 is formed by the display light DL.

The projector 3 is disposed in the housing 2 to project the display light DL onto the display surface 40. The reflector 5 is disposed outside the housing 2, and has the reflection surface 51 that reflects the real image 7 toward the eyepoint EP of the vehicle 100. The shape of the reflection surface 51 is a recessed shape such that the light rays 70 of the real image 7 intersect in the optical path 6 extending from the display surface 40 to the reflection surface 51 through the slit 24. Since the light rays 70 intersect between the display surface 40 and the reflection surface 51, the opening width Wd1 of the slit 24 can be reduced. Thus, the external light 80 can be prevented from entering the accommodation space 23. This enables a user to visually recognize a three-dimensional and clear virtual image.

The illustrated reflection surface 51 is shaped such that the light rays 70 of the real image 7 intersect in the slit 24. Such a configuration enables the opening width Wd1 of the slit 24 to be minimized.

The slit 24 of the present embodiment extends along the vehicle width direction W. The reflection surface 51 is shaped such that the light rays 70 of the real image 7 intersect in the vehicle height direction H and do not intersect in the vehicle width direction W. Thus, optical design of the reflection surface 51 is facilitated.

The reflector 5 of the present embodiment has a light-shielding property, and is located between the windshield 101 of the vehicle 100 and the slit 24. The reflector 5 shields the slit 24 from the external light 80 transmitted through the windshield 101. The external light 80 can be thereby effectively prevented from entering the accommodation space 23.

In the vehicle display device 1 according to the present embodiment, the surface of the outer wall 20 where the slit 24 is formed constitutes the upper surface 102*a* of the instrument panel 102 of the vehicle 100. The reflector 5 is disposed above the upper surface 102*a*. Since the reflector 5 is located above the instrument panel 102, a user can reduce visual line movement for looking at a meter.

In the vehicle display device 1 of the present embodiment, the single reflector 5 is disposed in the optical path from the display surface 40 to the eyepoint EP. Thus, the number of components can be reduced as compared to a configuration in which a plurality of reflectors are disposed. Additionally, in the vehicle display device 1 of the present embodiment, binocular parallax can be easily adjusted. For example, binocular parallax is adjusted more easily as compared to a configuration in which the light rays 70 of the real image are reflected toward the eyepoint EP by the windshield 101.

Modification of Embodiment

The shape of the display surface 40 is not limited to the hemispherical shape illustrated in the embodiment. The display surface 40 may have any three-dimensional shape. For example, the display surface 40 may be shaped like the vehicle 100. In this case, the real image 7 may be a brake lamp or a lamp of a direction indicator displayed on the display surface 40 having a vehicle body shape. The real image 7 may be an image representing an opening/closing condition of a door. The shape of the display surface 40 is not limited to the projecting shape. The display surface 40 may partially or entirely have a recessed shape.

Figure 7:
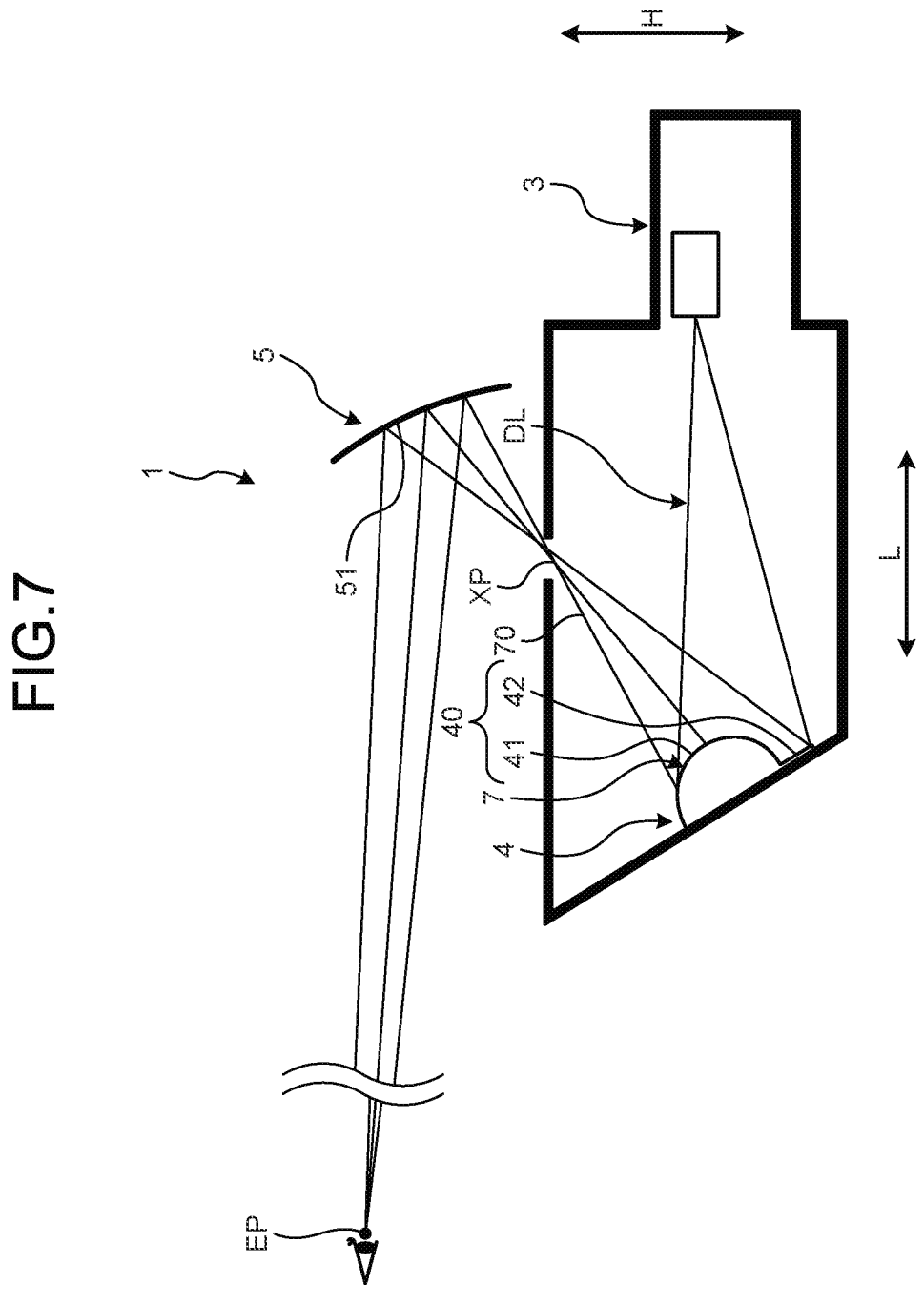
FIG. 7 is a view of a vehicle display device according to a modification of the embodiment.

The screen 4 may have a flat display surface in addition to the three-dimensional display surface. For example, the screen 4 may have a first display surface 41 having a three-dimensional shape and a second display surface 42 having a flat surface as illustrated in FIG. 7. In this case, the projector 3 projects the display light DL on the first display surface 41 and the second display surface 42. The display light DL forms the real image 7 on each of the first display surface 41 and the second display surface 42.

The position XP where the light rays 70 of the real image 7 intersect is not limited to the inside of the slit 24. For example, the light rays 70 may intersect at a position closer to the display surface 40 than the slit 24 is, or at a position closer to the reflection surface 51 than the slit 24 is.

Figure 8:
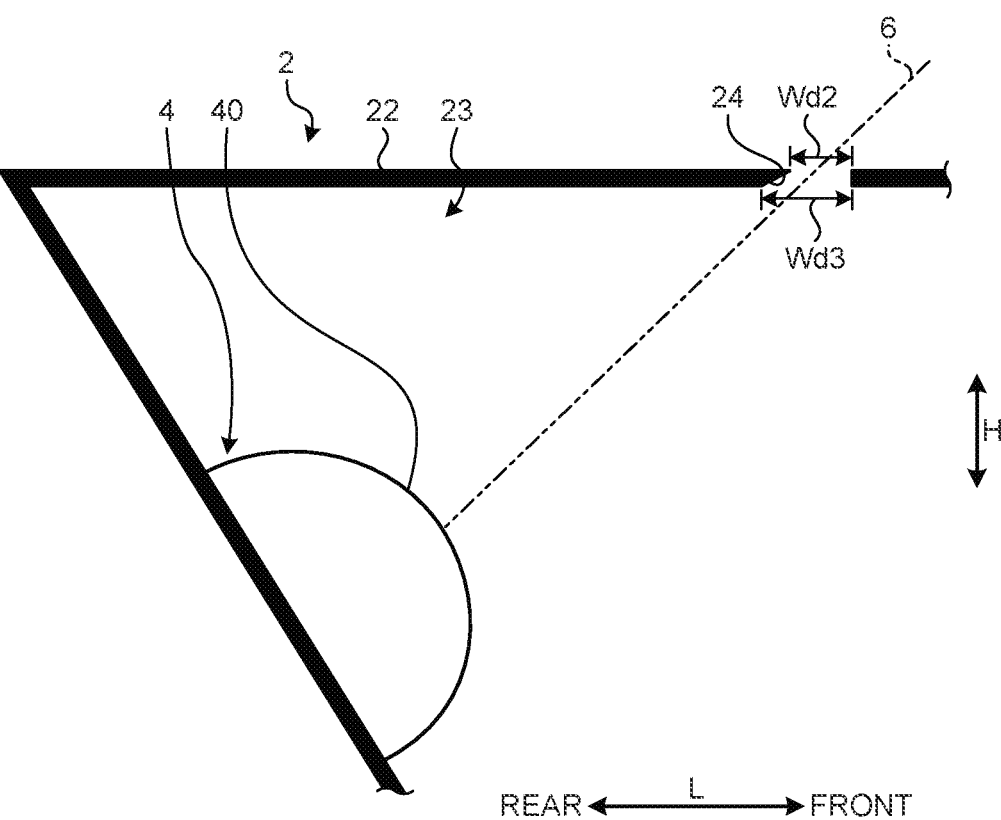
FIG. 8 is a sectional view of a slit according to another modification of the embodiment.

As illustrated in FIG. 8, the opening width of the slit 24 may differ between the side of the accommodation space 23 and the side of the outer space. In the slit 24 illustrated in FIG. 8, an opening width Wd2 on the outlet side is smaller than an opening width Wd3 on the inlet side. In other words, the opening width Wd2 in a portion opening toward the outer space is smaller than the opening width Wd3 in a portion opening toward the accommodation space 23. Thus, the external light 80 hardly enters the accommodation space 23. In the illustrated slit 24, a surface thereof closer to the rear side in the vehicle is inclined so as to make the opening widths Wd2 and Wd3 different. The thickness of the lid 22 is, for example, 5 mm. In this case, the opening width Wd2 on the upper side may be 6 mm, and the opening width Wd3 on the lower side may be 10 mm.

Figure 9:
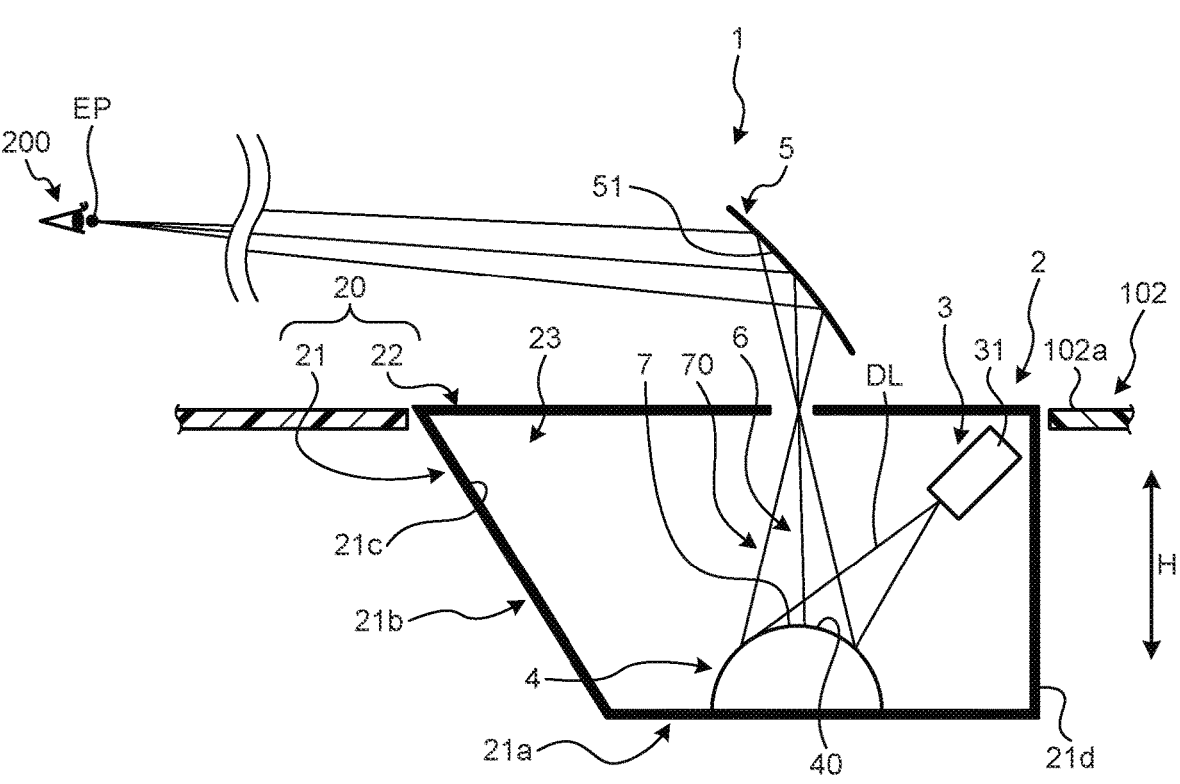
FIG. 9 is a view of a vehicle display device according to still another modification of the embodiment.

As illustrated in FIG. 9, the screen 4 may be disposed on the bottom wall 21*a*. The screen 4 illustrated in FIG. 9 is disposed directly below the slit 24. However, the position of the screen 4 is not limited to the position directly below the slit 24. For example, the screen 4 may be located more to the front side or the rear side in the vehicle longitudinal direction L than the position illustrated in FIG. 9 is. The reflector 5 is arranged so as to reflect the real image 7 formed on the screen 4 toward the eyepoint EP.

In the vehicle display device 1 illustrated in FIG. 9, the output unit 31 of the projector 3 is disposed inside the housing 2. The output unit 31 is disposed above the screen 4 to project the display light DL onto the display surface 40 that is located obliquely below the output unit 31.

Figure 10:
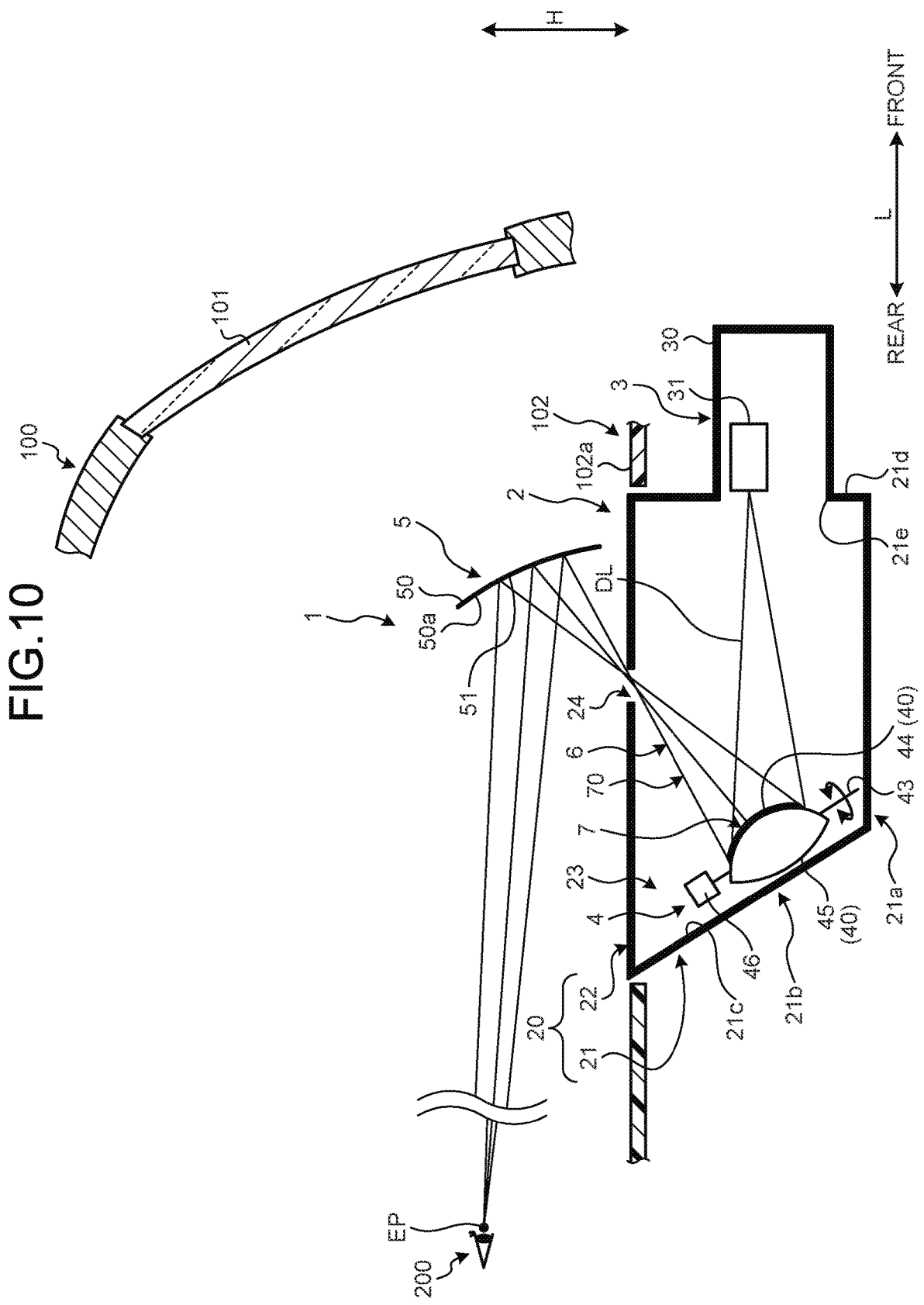
FIG. 10 is a view of a vehicle display device according to still another modification of the embodiment.

The screen 4 may change the shape of the display surface 40 according to the contents of the projected image. For example, the screen 4 may be rotatable as illustrated in FIG. 10. The screen 4 illustrated in FIG. 10 has a rotating shaft 43 connected to the display surface 40, and a motor 46 configured to rotate the rotating shaft 43. The rotating shaft 43 extends along, for example, the wall surface 21*c*. The motor 46 rotates the rotating shaft 43. The display surface 40 has a first display surface 44 and a second display surface 45. The motor 46 switches a state in which the first display surface 44 is directed to the slit 24 and a state in which the second display surface 45 is directed to the slit 24 by rotating the rotating shaft 43.

Both of the first display surface 44 and the second display surface 45 illustrated in FIG. 10 have a projecting shape, e.g., a spherical shape. The first display surface 44 and the second display surface 45 have different curvatures. Switching the first display surface 44 and the second display surface 45 having different shapes allows for various kinds of image expression. The first display surface 44 and the second display surface 45 may have any shape. The first display surface 44 and the second display surface 45 may have a shape different from the spherical shape, or do not have to have the projecting shape.

The configuration of the housing 2 is not limited to that illustrated in the embodiment. For example, the lid 22 of the above embodiment may be integrated with the side wall 21*b*. In this case, for example, the bottom wall 21*a* and the side wall 21*b* are formed separately. The housing 2 may be divided into upper and lower portions in the middle of the vehicle height direction H.

The display surface 40 is not limited to the screen 4. In other words, the display surface 40 is not limited to a screen formed for displaying an image. The display surface 40 may be, for example, a surface of a three-dimensional object. The display surface 40 only needs to diffuse the display light DL at the display surface 40.

The contents disclosed in the above embodiment and modifications can be combined as appropriate and carried out.

In the vehicle display device according to the embodiment, the shape of the reflection surface of the reflector is a recessed shape such that the light rays of the real image intersect in the optical path extending from the display surface to the reflection surface through the slit. Thus, the opening width of the slit can be reduced, making the accommodation space dark. This enables a user to visually recognize a three-dimensional and clear virtual image. The vehicle display device according to the embodiment provides such an effect that three-dimensional expression can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:

a housing mounted in a vehicle and having a light-shielding outer wall that forms an accommodation space, a slit being formed in the outer wall;

a three-dimensional display surface disposed in the accommodation space and on which a real image is formed by display light;

a projector disposed in the housing and configured to project the display light onto the display surface; and a reflector disposed outside the housing and having a reflection surface configured to reflect the real image toward an eyepoint in the vehicle, wherein a shape of the reflection surface is a recessed shape such that light rays of the real image intersect in an optical path extending from the display surface to the reflection surface through the slit, and wherein the slit is narrower at an outside of the housing than at an inside of the housing, wherein the slit extends along a vehicle width direction, and the reflection surface is shaped such that the light rays of the real image intersect in a vehicle height direction and do not intersect in the vehicle width direction, wherein a surface of the outer wall where the slit is formed constitutes an upper surface of an instrument panel of the vehicle, and the reflector is disposed above the upper surface, wherein the three-dimensional display surface is within the housing, comprises a convex surface of which the display light from the projector is reflected to a concave surface of the reflector, and of which the convex surface of the three-dimensional display surface is facing the concave surface of the reflector with the slit arranged therebetween.

2. The vehicle display device according to claim 1, wherein the reflector has a light shielding property, and is located between a windshield of the vehicle and the slit to shield the slit from external light transmitted through the windshield.

3. The vehicle display device according to claim 1, wherein the projector generates an image representing a traveling speed of the vehicle, and the reflector reflects the image representing the traveling speed toward the eyepoint.

4. The vehicle display device according to claim 2, wherein the projector generates an image representing a traveling speed of the vehicle, and the reflector reflects the image representing the traveling speed toward the eyepoint.

5. The vehicle display device according to claim 1, wherein the display surface is a screen.

6. The vehicle display device according to claim 2, wherein the display surface is a screen.

7. A vehicle display device comprising:

a housing mounted in a vehicle and having a light-shielding outer wall that forms an accommodation space, a slit being formed in the outer wall;

a three-dimensional display surface disposed in the accommodation space and on which a real image is formed by display light;

a projector disposed in the housing and configured to project the display light onto the display surface; and a reflector disposed outside the housing and having a reflection surface configured to reflect the real image toward an eyepoint in the vehicle, wherein a shape of the reflection surface is a recessed shape such that light rays of the real image intersect in an optical path extending from the display surface to the reflection surface through the slit, and wherein the slit is narrower at an outside of the housing than at an inside of the housing, wherein the slit extends along a vehicle width direction, and the reflection surface is shaped such that the light rays of the real image intersect in a vehicle height direction and do not intersect in the vehicle width direction, wherein a surface of the outer wall where the slit is formed constitutes an upper surface of an instrument panel of the vehicle, and the reflector is disposed above the upper surface, wherein the light rays of the real image intersect in the vehicle height direct and within the slit.

8. The vehicle display device according to claim 7, wherein the reflector has a light shielding property, and is located between a windshield of the vehicle and the slit to shield the slit from external light transmitted through the windshield.

9. The vehicle display device according to claim 7, wherein the projector generates an image representing a traveling speed of the vehicle, and the reflector reflects the image representing the traveling speed toward the eyepoint.

10. The vehicle display device according to claim 8, wherein the projector generates an image representing a traveling speed of the vehicle, and the reflector reflects the image representing the traveling speed toward the eyepoint.

11. The vehicle display device according to claim 7, wherein the display surface is a screen.

12. The vehicle display device according to claim 8, wherein the display surface is a screen.

* * * * *